United States Patent [19]

Muratomi

[11] Patent Number: 5,198,930
[45] Date of Patent: Mar. 30, 1993

[54] WIDE-BAND HALF-MIRROR

[75] Inventor: Keiji Muratomi, Warabi, Japan

[73] Assignee: Kabushiki Kaisha TOPCON, Tokyo, Japan

[21] Appl. No.: 744,600

[22] Filed: Aug. 12, 1991

Related U.S. Application Data

[63] Continuation-in-part of Ser. No. 633,189, Dec. 28, 1990, abandoned, which is a continuation of Ser. No. 476,886, Feb. 8, 1990, abandoned.

[30] Foreign Application Priority Data

Feb. 14, 1989 [JP] Japan .................................. 1-34564

[51] Int. Cl.$^5$ ........................ G02B 5/28; G02B 27/14
[52] U.S. Cl. .................................. 359/583; 359/359; 359/588; 359/589; 359/634; 359/839
[58] Field of Search ............... 359/350, 359, 360, 577, 359/580, 583, 584, 586, 588, 589, 629, 634, 839

[56] References Cited

U.S. PATENT DOCUMENTS

| | | | |
|---|---|---|---|
| 2,700,323 | 1/1955 | Schröder | 359/359 |
| 3,614,188 | 10/1971 | Seeley et al. | 359/359 |
| 4,904,083 | 2/1990 | Lu et al. | 356/350 |
| 4,931,315 | 6/1990 | Mellor | 359/589 |
| 4,932,754 | 6/1990 | Haisma et al. | 359/589 |
| 4,979,802 | 12/1990 | Ichikawa | 359/839 |

OTHER PUBLICATIONS

Jenkins, F. A. and White, H. E., *Fundamenals of Optics*, 3rd Edition, McGraw-Hill, New York 1957, chapter 25, pp. 509–534.

Primary Examiner—Bruce Y. Arnold
Assistant Examiner—David R. Parsons
Attorney, Agent, or Firm—Mason, Fenwick & Lawrence

[57] ABSTRACT

The operable wavelength band of a wide-band half-mirror is windened by inserting, between (1) a substrate having index of refraction $n_{sub}$ and (2) layers with indices of refraction $(n_H \cdot n_L)^2$ of the known four-film type dielectric half mirror having a construction represented by $n_{sub}/(n_H \cdot n_L)^2/air$; alternating layers of: (a) high refractive index dielectric substances $n_{H1}, n_{H2} \ldots$; and (b) low refractive index dielectric substances $n_{L1}, n_{L2} \ldots$; each film having a thickness of $\lambda_o/2$. The alternating layers to be inserted have indices of refraction related as follows:

$$n_{sub} \leq n_{H1} \leq n_{H2} \leq \ldots \leq n_{HN} \text{ and}$$

$$n_{sub} \geq n_{L1} \geq L_{L2} \geq \ldots \geq n_{LN}$$

The alternating layer structures according to one of the following formulas (1) or (2) are inserted between the substrate $n_{sub}$ and layers $(n_H \cdot n_L)^2$.

$(2n_{H1} \cdot 2n_{L1} \cdot 2n_{H2} \cdot 2n_{L2} \cdots 2n_{H(N-1)} \cdot 2n_{L(N-1)})$   Formula (1)

$(2n_{L1} \cdot 2n_{H1} \cdot 2n_{L2} \cdot 2n_{H2} \cdots 2n_{H(N-2)} \cdot 2n_{L(N-1)})$   Formula (2)

The alternating layer structure defined by Formula (1) has a layer $2n_{H1}$ closest to the substrate, while the alternating layer structure defined by Formula (2) has a layer $2n_{L1}$ closest to the substrate.

4 Claims, 9 Drawing Sheets

WIDE-BAND HALF-MIRROR

This application is a continuation-in-part of U.S. patent application Ser. No. 633,198, filed Dec. 28, 1990, (now abandoned) which is a file wrapper continuation of U.S. patent application Ser. No. 476,886, filed Feb. 8, 1990 (now abandoned).

BACKGROUND OF THE INVENTION

1. Field of the Invention

The present invention relates to half-mirrors. More specifically, it relates to a half-mirror usable over a wide wavelength region including the visible and infrared spectrum.

2. Related Art

The present specification uses the following symbols as defined below, as commonly used by those skilled in the art:

n means an index of refraction;

$n_{sub}$ means the index of refraction of a substrate (such as glass), and is also used loosely to denote the substrate itself;

$n_H$ means an index of refraction higher than $n_{sub}$, and is also used loosely to denote the substance itself having that index of refraction;

$n_L$ means an index of refraction lower than $n_{sub}$, and is also used loosely to denote the substance itself having that index of refraction;

1, 2, 3, ... N−1, N are subscripts denoting layer numbers of dielectric substances.

Further, as used in this specification to describe the invention, coefficients such as 1 and 2, when preceding the characters n, indicate that the corresponding dielectric layers have thicknesses of $\lambda_o/4$ and $\lambda_o/2$, respectively. Thus, $1n_L$ (or simply, $n_L$) denotes a substance having an index of refraction $n_L$ and a thickness of $\lambda_o/4$. In contrast, $2n_H$ denotes a substance having an index of refraction $n_H$ and a thickness of $\lambda_o/2$. When the coefficient is 1.1, 2.1 or 2.2, and the angle of incidence is 45°, the invention provides that thicknesses are corrected to be $1.1(\lambda_o/4)$, $2.1(\lambda_o/4)$, $2.2(\lambda_o/4)$.

Figure 12:
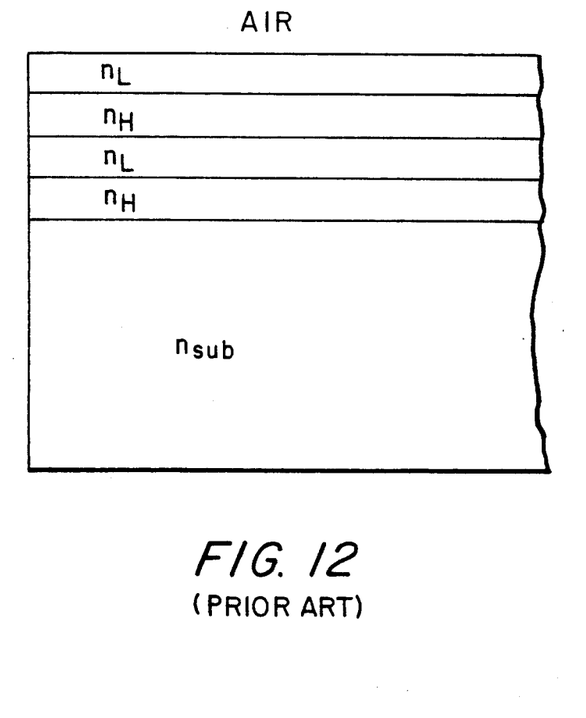
FIG. 12 is a side view of a first known half-mirror, described in the Background of the Invention.

A first known half-mirror for the visible wavelength region is, for example, a four-layered half-mirror illustrated in FIG. 12. This known half-mirror has a construction which may be represented by:

$$n_{sub}/(n_H \cdot n_L)^2/\text{air}$$

in which:

TiO$_2$ (refraction index $n_H$=2.35) is used as the film $n_H$;

MgF$_2$ (refraction index $n_L$=1.38) is used as the film $n_L$;

each film has an optical path length (or layer thickness) of $\lambda_o/4$ (where $\lambda_o$=center wavelength);

the superscript 2 in $(n_H \cdot n_L)^2$ simply means a repetition of the $(n_H \cdot n_L)$ layers which are in the parentheses;

"$n_{sub}/$" at the beginning of the definition means that the substrate is present on a first side of the layers; and "/air" at the end of the definition means that air is present on the opposite side of the layers than the substrate.

Figure 9:
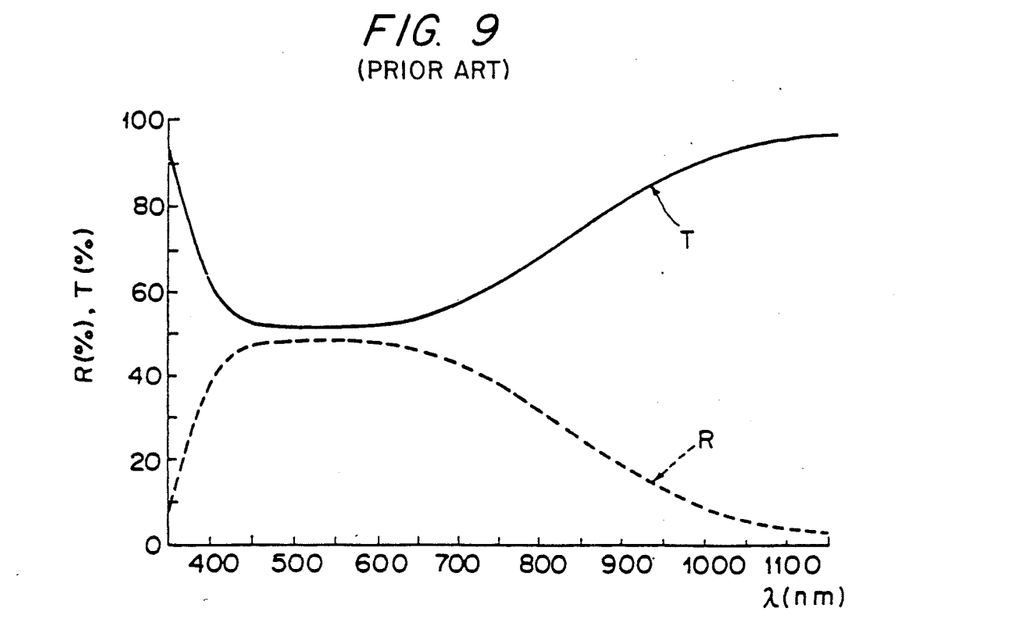
FIG. 9 is a graph showing the spectral characteristics of a conventional dielectric multi-film half-mirror, for use at an incident angle of 0° (perpendicular to the mirror)
Figure 10:
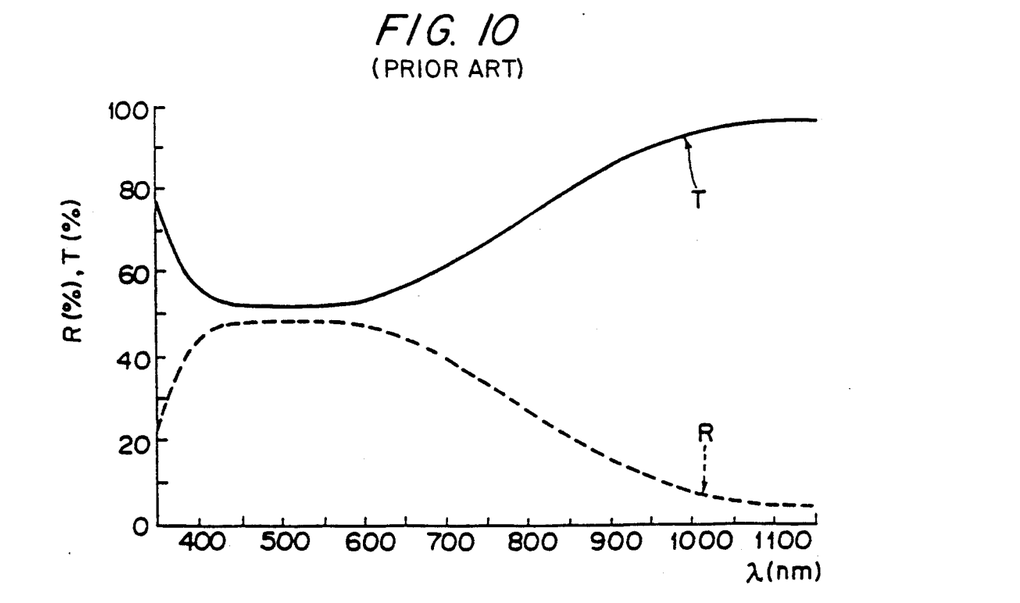
FIG. 10 is a graph showing the spectral characteristics of a conventional dielectric multi-film half-mirror, for using at an incident angle of 45°.

FIGS. 9 and 10 show the spectral transmission/reflection characteristics of the known half mirror shown in FIG. 12. FIG. 9 shows characteristics obtained in response to incident light applied perpendicular to the mirror (0°, by convention), while FIG. 10 shows the characteristic obtained when the incident angle is 45° from the perpendicular. Solid-line curves T and broken-line curves R show transmissivity and reflectivity, respectively.

In all drawing figures, when the incident angle is 45°, the film thicknesses are adjusted for use at that incident angle. Furthermore, when the incident angle is 45°, the reflectivity and the transmissivity are shown as mean values of the P and S components of the polarized light. As described in Chapter 25 of *Fundamentals of Optics*, Jenkins et al. (McGraw-Hill; Kōgakusha), incorporated herein by reference, the P "vibrations" are those parallel to the plane of incidence, and the S "vibrations" are perpendicular to the plane of incidence.

A second known half-mirror is capable of covering a wide wavelength region including visible and infrared regions, such as a half-mirror obtained by forming a thin metal film such as CHROMEL (nickel-chrome, e.g., NiCr 80:20) coated on a transparent substrate. The spectral transmission/reflection characteristics of such a half-mirror are shown in FIG. 11.

As apparent from the spectral characteristics in FIGS. 9 and 10, the first known type dielectric half-mirror has a transmitted:reflected light quantity ratio of 1:1 in the visible region, as is desirable. However, in the near-infrared region of wavelength region (between 700 to 900 nm), the light-quantity ratio of 1:1 cannot be obtained because transmissivity increases and reflectivity decreases, with increasing wavelength. Thus, the wavelength region over which the half-mirror functions is narrowed, which is undesirable.

Figure 11:
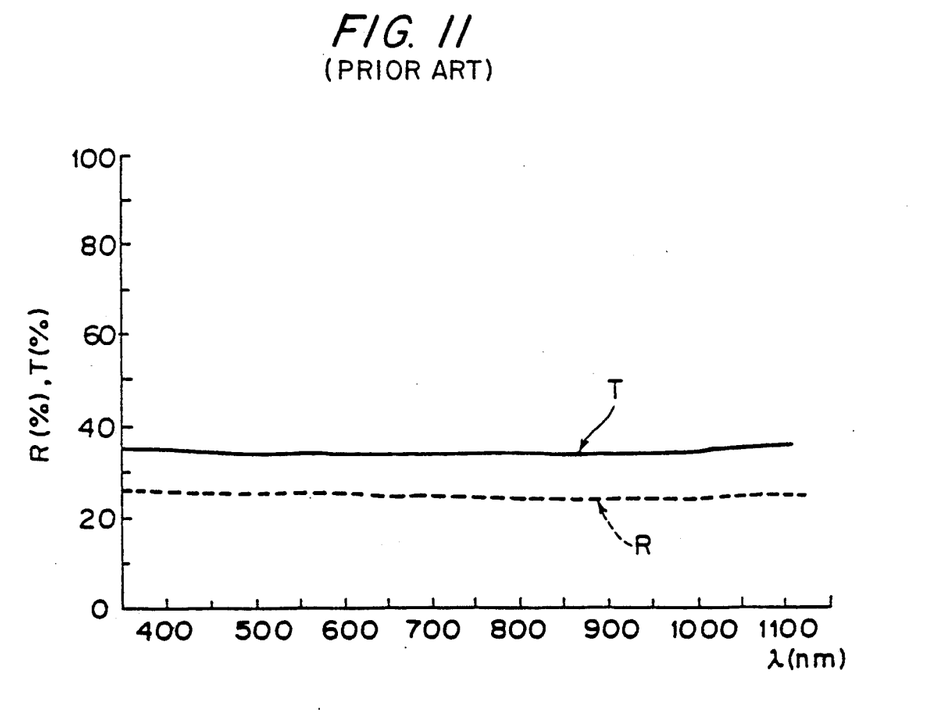
FIG. 11 is a graph showing the spectral characteristics of a conventional metal-film-coating mirror.

The second type of half-mirror, such as that illustrated in FIG. 11, exhibits flat spectral characteristics over a wide wavelength region. However, half-mirrors of this type also exhibit a large light absorption, about 40%. Hence, such half-mirrors cause a large loss of light quantity, which is also undesirable.

Thus, these known half-mirrors have either a disadvantage of either too narrow a bandwidth or too much light absorption. There is a need in the art to provide a half-mirror which both has both a wide bandwidth and which has low light absorption.

SUMMARY OF THE INVENTION

A first object of the present invention is to provide a wide-band half-mirror which employs dielectric films, and which is capable of dividing incident light into a transmitted light component and a reflected light component substantially at a ratio of 1:1 over a wide wavelength region including visible and infrared rays, with reduced light absorption.

Another object of the present invention is to provide a half-mirror which is improved to eliminate any tendency for coloring of the transmitted and reflected light components attributable to deviation of the center wavelength due to manufacturing error.

According to the present invention, the operable wavelength band is widened by inserting, between:

(1) a substrate having index of refraction $n_{sub}$; and (2) layers with indices of refraction $(n_H \cdot n_L)^2$ of the known four-film type dielectric half mirror having a construction represented by $n_{sub}/(n_H \cdot n_L)^2/\text{air}$;

alternating layers of:

(a) high refractive index dielectric substances $n_{H1}$, $n_{H2}$ ... ; and (b) low refractive index dielectric substances $n_{L1}$, $n_{L2}$ ... , each film having a thickness of $\lambda_o/2$. The alternating layers to be inserted have indices of refraction related as follows:

$$n_{sub} \leq n_{H1} \leq n_{H2} \leq \ldots \leq n_{HN}$$

and $$n_{sub} \geq n_{L1} \geq n_{L2} \geq \ldots \geq n_{LN}$$

Alternating layer structures according to one of the following formulas (1) or (2) is inserted between the substrate $n_{sub}$ and layers $(n_H \cdot n_L)^2$:

$$(2n_{H1} \cdot 2n_{L1} \cdot 2n_{H2} \cdot 2n_{L2} \cdot \ldots 2n_{H(N-1)} \cdot 2n_{L(N-1)}) \quad \text{Formula (1)}$$

$$(2n_{L1} \cdot 2n_{H1} \cdot 2n_{L2} \cdot 2n_{H2} \cdot \ldots 2n_{H(N-2)} \cdot 2n_{L(N-1)}) \quad \text{Formula (2)}$$

Figure 13:
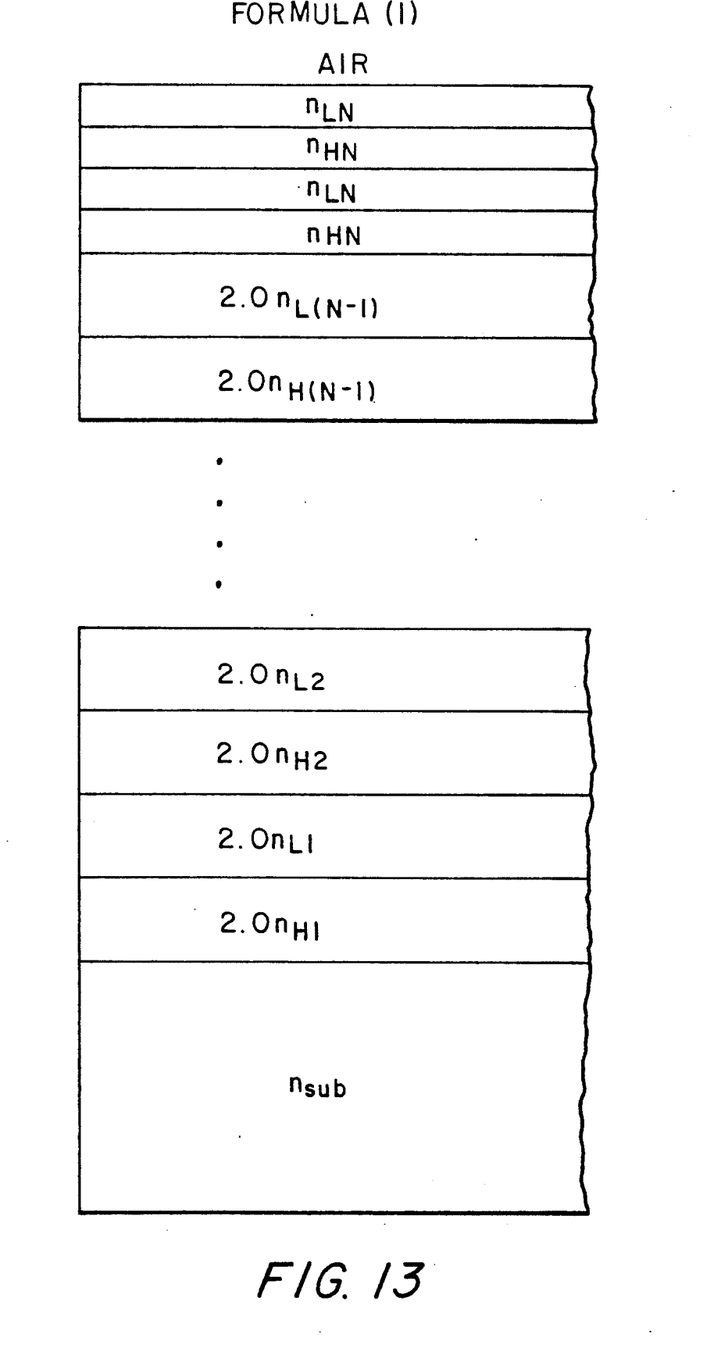
FIG. 13 is a side view of an embodiment of the invention defined in accordance with Formula (1), above.
Figure 14:
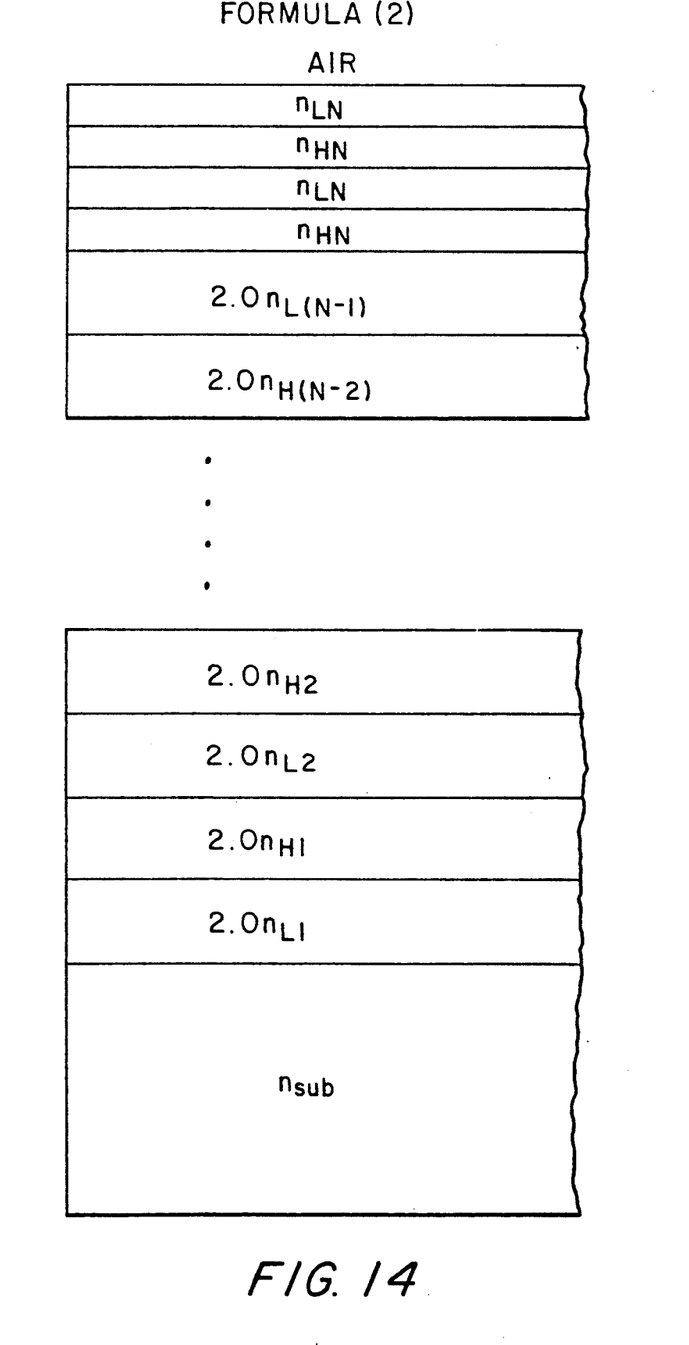
FIG. 14 is a side view of an embodiment of the invention defined in accordance with Formula (2), above.

The alternating layer structure defined by Formula (1) is shown in FIG. 13, and has a layer $2n_{H1}$ closest to the substrate. The alternating layer structure defined by Formula (2) is illustrated in FIG. 14, and has a layer $2n_{L1}$ closest to the substrate. Thus, the final structure is defined by either:

$$n_{sub}/(2n_{H1} \cdot 2n_{L1} \cdot 2n_{H2} \cdot 2n_{L2} \cdot \ldots$$
$$2n_{H(N-1)} \cdot 2n_{L(N-1)}) \cdot (n_{HN} \cdot n_{LN})^2/\text{air}$$

$$n_{sub}/(2n_{L1} \cdot 2n_{H1} \cdot 2n_{L2} \cdot 2n_{H2} \cdot \ldots$$
$$2n_{H(N-2)} \cdot 2n_{L(n-1)}) \cdot (n_{HN} \cdot n_{LN})^2/\text{air}$$

Further objects, features and advantages of the present invention will become apparent from the following Detailed Description of the Preferred Embodiments and the attached drawing figures.

DETAILED DESCRIPTION OF THE PREFERRED EMBODIMENTS

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose. Further, the following embodiments are exemplary, and not limiting.

Figure 1:
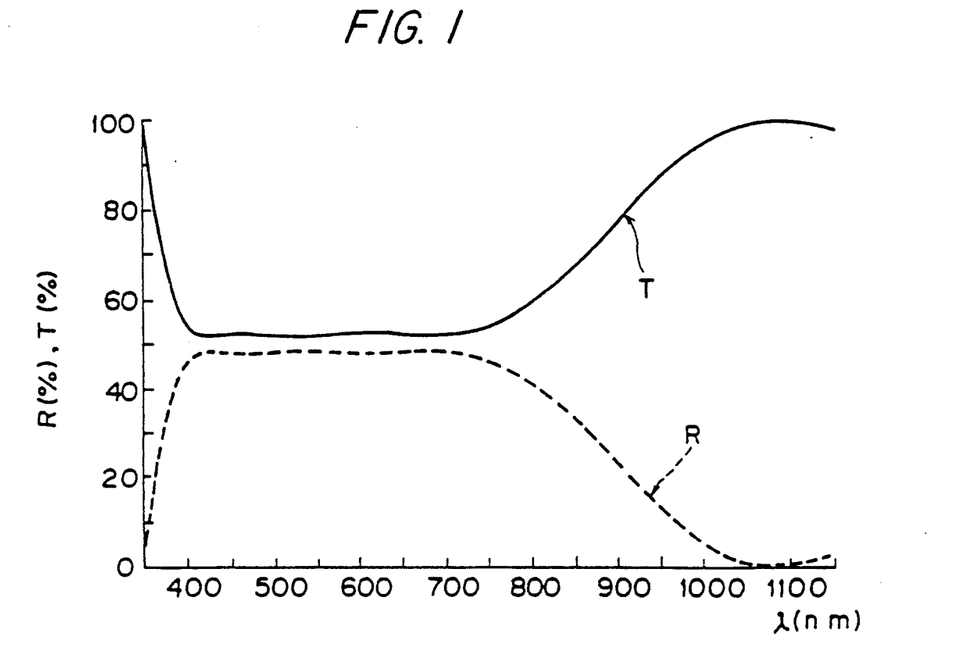
FIG. 1 is a graph showing the spectral characteristics of a first embodiment of the half-mirror of the present invention.
Figure 2:
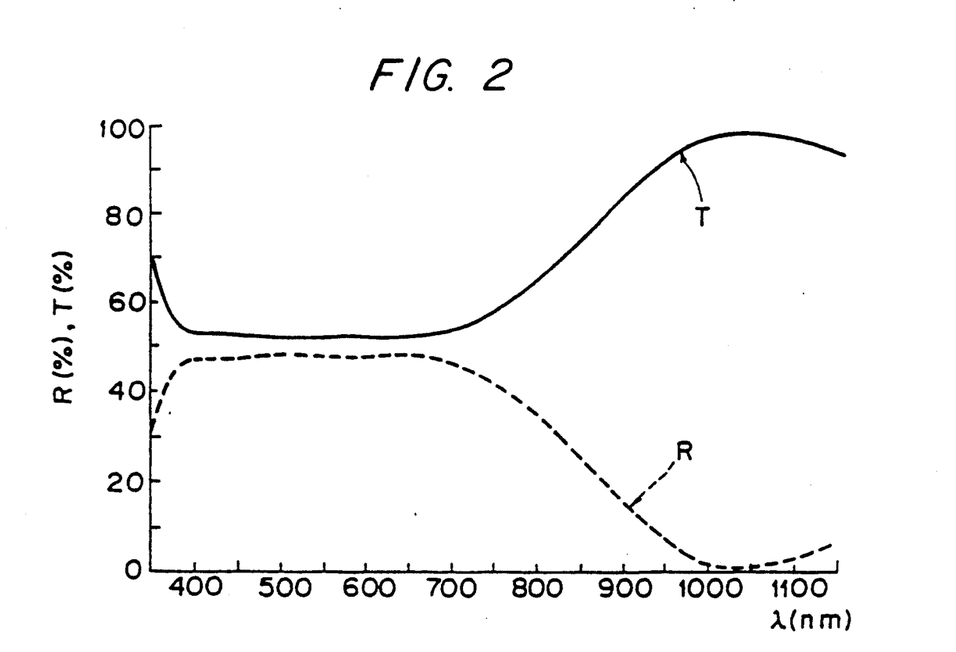
FIG. 2 is a graph showing the spectral characteristics of a second embodiment of the half-mirror of the present invention.

First and second embodiments of the invention are constructed in accordance with Formula (1) and have spectral transmission/reflection characteristics shown in FIGS. 1 and 2, respectively. The first embodiment is used at an incident angle of 0° and has the following layer construction:

$$1.51/(2n_{H1} \cdot 2n_{L1}) \cdot (n_{H2} \cdot n_{L2})^2/\text{air}$$

The second embodiment is used at an incident angle of 45° and has the following layer construction;

$$1.51/(2.1n_{H1} \cdot 2.2n_{L1}) \cdot (n_{H2} \cdot 1.1n_{L2})^2/\text{air}$$

In these embodiments:
$n_{H1} = 1.63$ ($Al_2O_3$)
$n_{H2} = 2.35$ ($TiO_2$, ZnS)
$n_{L1} = n_{L2} = 1.38$ ($MgF_2$).

In the second embodiment, the thickness of each layer of the formula (2) is adjusted so as not to shift the center of spectral transmission/reflection regions. Adjustment coefficients are as follows:

| For the high refraction $n_{H2}$: | 1.0 |
| For the middle refraction $n_{L1}$, $n_{H1}$: | 1.05 |
| For the low refraction $n_{L2}$: | 1.1 |

Figure 3:
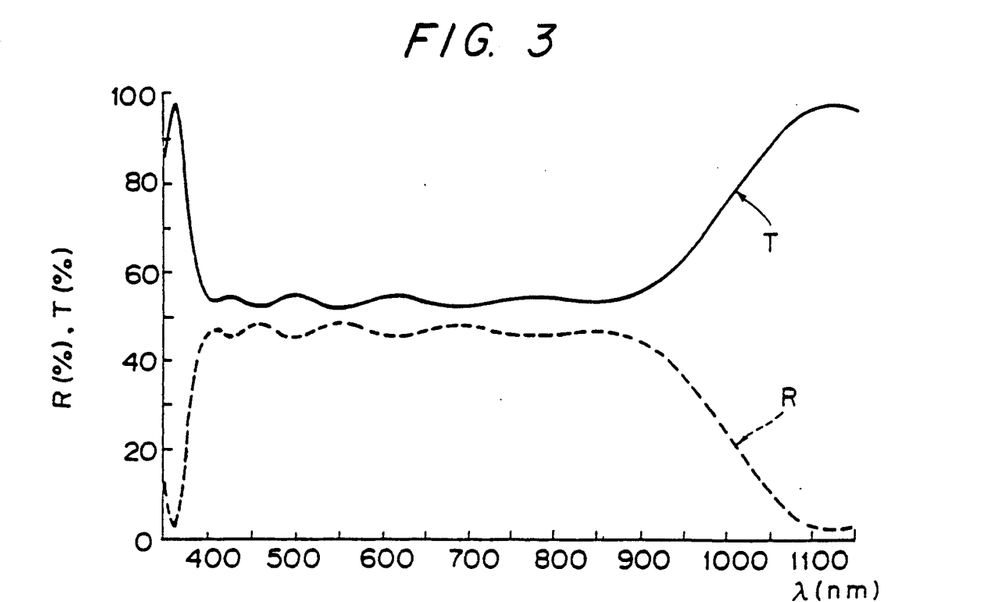
FIG. 3 is a graph showing the spectral characteristics of a third embodiment of the half-mirror of the present invention.
Figure 4:
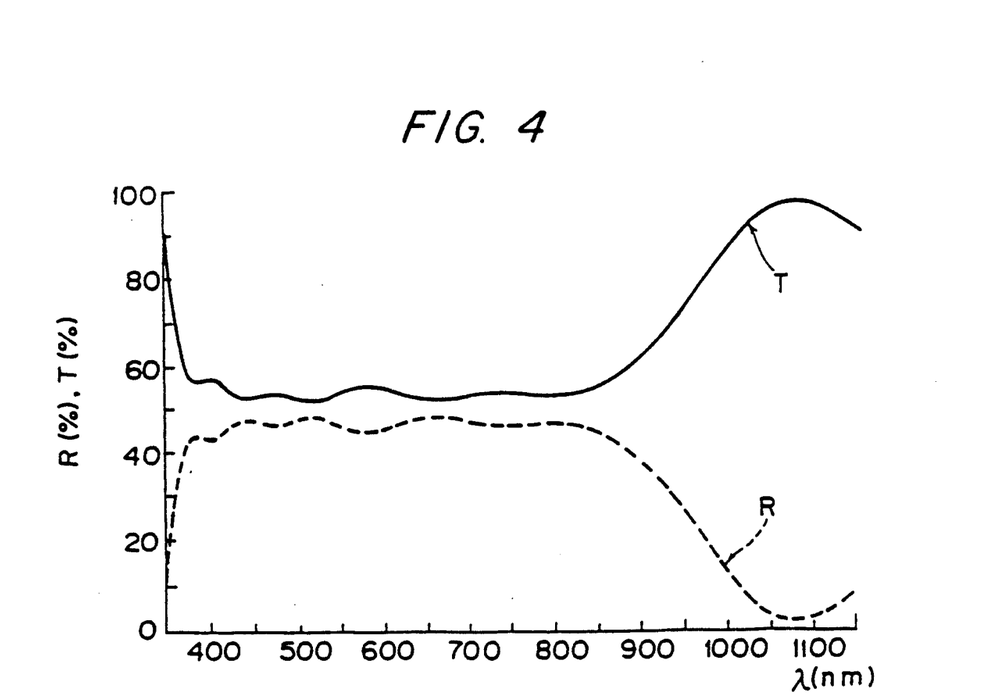
FIG. 4 is a graph showing the spectral characteristics of a fourth embodiment of the half-mirror of the present invention.

Third and fourth embodiments are constructed in accordance with Formula (1) and have spectral transmission-reflection characteristics shown in FIGS. 3 and 4, respectively. The third embodiment is used at an incident angle of 0° and has the following layer construction;

$$1.51/(2n_{H1} \cdot 2n_{L1} \cdot 2n_{H2} \cdot 2n_{L2}) \cdot (n_{H3} \cdot n_{L3})^2/\text{air}$$

The fourth embodiment is used at an incident angle of 45° and has the following layer construction:

$$1.51/(2.1n_{H1} \cdot 2.2n_{L1} \cdot 2n_{H2} \cdot 2.2n_{L2}) \cdot (n_{H3} \cdot 1.1n_{L3})^2/\text{air}$$

In these embodiments:
$n_{H1} = 1.63$ ($Al_2O_3$)
$n_{H2} = 1.80$ ($Y_2O_3$)
$n_{H3} = 2.35$ ($TiO_2$, ZnS)
$n_{L1} = 1.46$ ($SiO_2$)
$n_{L2} = n_{L3} = 1.38$ ($MgF_2$)

In the fourth embodiment, the thickness of each layer of Formula (1) is adjusted so as not to shift the center of spectral transmission/reflection region. Adjustment coefficients are as follows:

| | |
|---|---|
| For the high refraction $n_{H2}$, $n_{H3}$: | 1.0 |
| For the middle refraction $n_{H1}$: | 1.05 |
| For the low refraction $n_{L1}$, $n_{L2}$, $n_{L3}$: | 1.1 |

Figure 5:
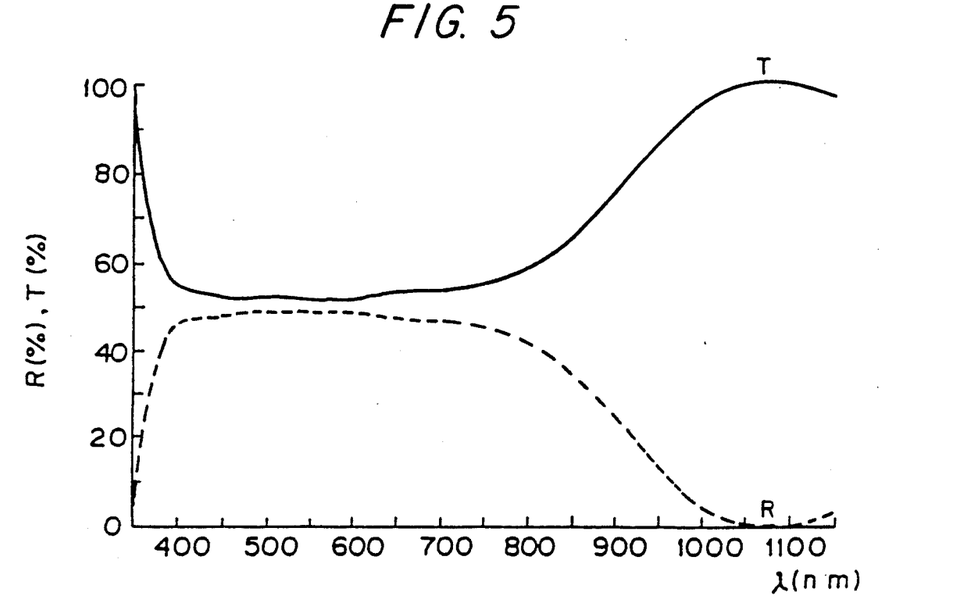
FIG. 5 is a graph showing the spectral characteristics of a fifth embodiment of the half-mirror of the present invention.
Figure 6:
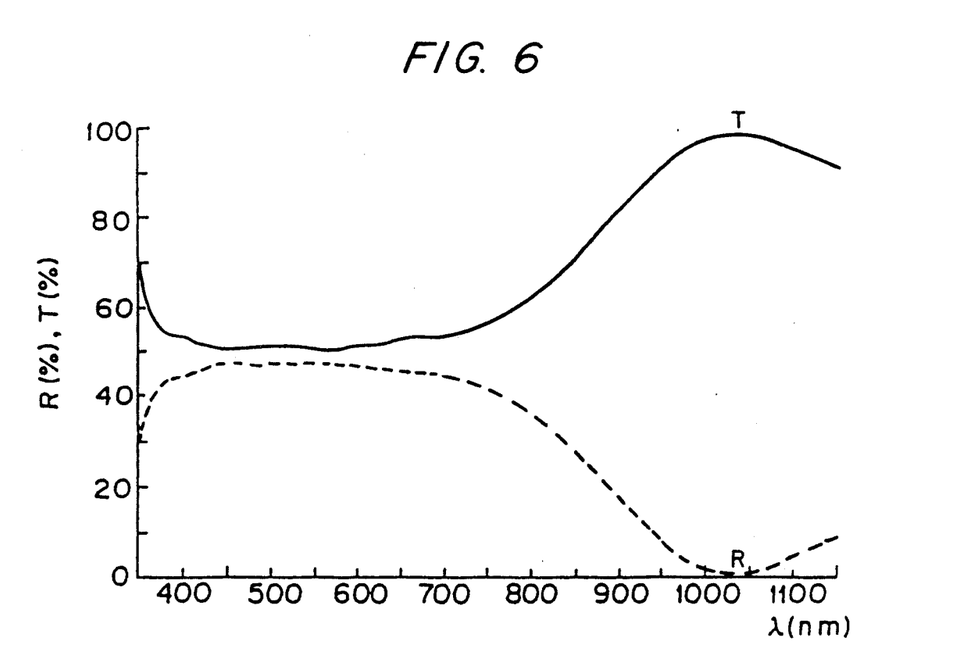
FIG. 6 is a graph showing the spectral characteristics of a sixth embodiment of the half-mirror of the present invention.

Fifth and sixth embodiments are constructed in accordance with Formula (2) and have spectral transmission-reflection characteristics shown in FIGS. 5 and 6, respectively. The fifth embodiment is used at an incident angle of 0° and has the following layer construction:

$$1.51/(2n_{L1} \cdot 2n_{H1} \cdot 2n_{L2}) \cdot (n_{H3} \cdot n_{L3})^2/\text{air}$$

The sixth embodiment is used at an incident angle of 45° and has the following layer construction:

$$1.51/(2.2n_{L1} \cdot 2.1n_{H1} \cdot 2.2n_{L2}) \cdot (n_{H3} \cdot 1.1n_{L3})^2/\text{air}$$

In these embodiments:
$n_{H1} = 1.63$ (Al$_2$O$_3$).
$n_{H3} = 2.35$ (T$_i$O$_2$, ZnS).
$n_{L1} = 1.46$ (SiO$_2$).
$n_{L2} = n_{L3} = 1.38$ (MgF$_2$).

In the sixth embodiment, the thickness of each layer of the formula (2) is adjusted so as not to shift the center of spectral transmission/reflection region. Adjustment coefficients are as follows:

| | |
|---|---|
| For the high refraction $n_{H2}$: | 1.0 |
| For the middle refraction $n_{H1}$: | 1.05 |
| For the low refraction $n_{L1}$, $n_{L2}$, $n_{L3}$: | 1.1 |

Figure 7:
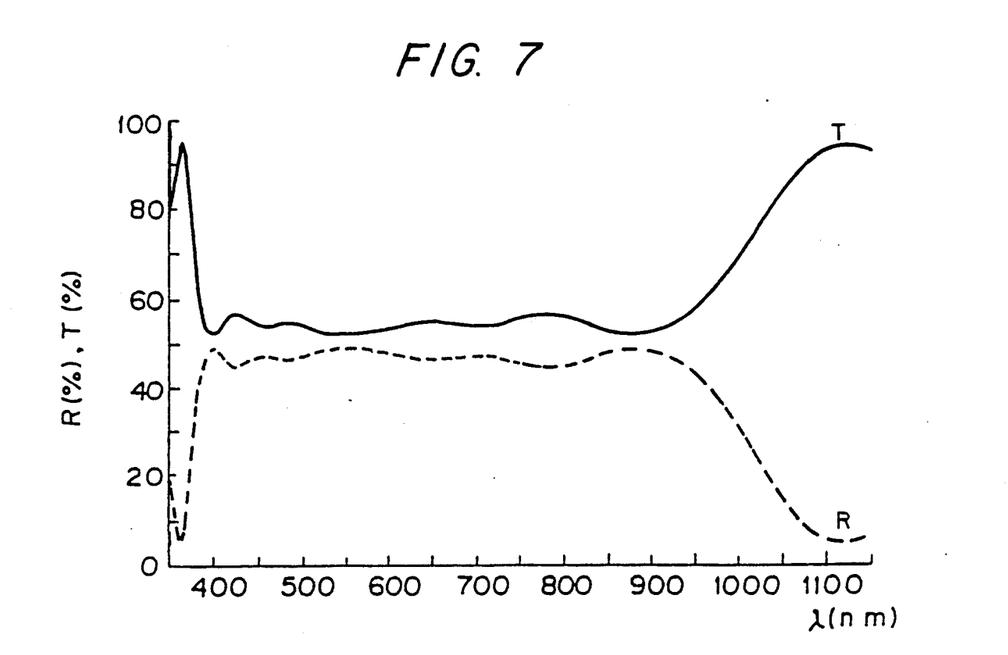
FIG. 7 is a graph showing the spectral characteristics of a seventh embodiment of the half-mirror of the present invention.
Figure 8:
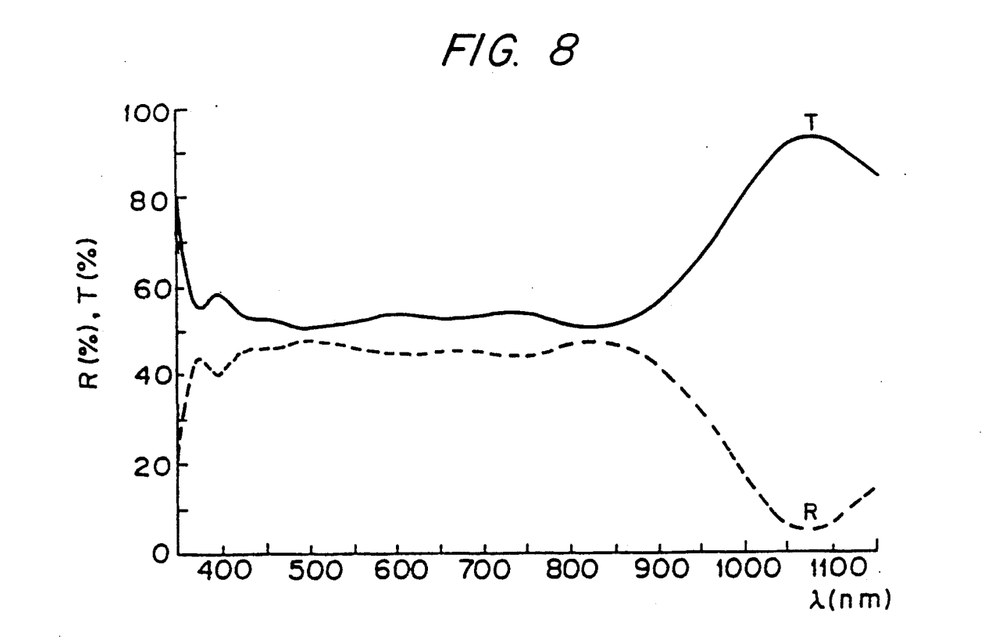
FIG. 8 is a graph showing the spectral characteristics of an eighth embodiment of the half-mirror of the present invention.

Seventh and eighth embodiments are constructed in accordance with Formula (2) and have spectral transmission-reflection characteristics shown in FIGS. 7 and 8, respectively. The seventh embodiment is used at an incident angle of 0° and has the following layer construction:

$$1.51/(2n_{L1} \cdot 2n_{H1} \cdot 2n_{L2} \cdot 2n_{H2} \cdot 2n_{L3}) \cdot (n_{H4} \cdot n_{L4})^2/\text{air}$$

The eighth embodiment is used at an incident angle of 45° and has the following layer construction:

$$1.51/(2.2n_{L1} \cdot 2.1n_{H1} \cdot 2.2n_{L2} \cdot 2n_{H2} \cdot 2.2n_{L3}) \cdot (n_{H4} \cdot 1.1n_{L4})^2/\text{air}$$

In these embodiments:
$n_{H1} = 1.63$ (Al$_2$O$_3$).
$n_{H2} = 1.80$ (Y$_2$O$_3$).
$n_{H4} = 2.35$ (T$_i$O$_2$, ZnS).
$n_{L1} = 1.46$ (SiO$_2$).
$n_{L2} = n_{L3} = n_{L4} = 1.38$ (MgF$_2$).

In the eighth embodiment, the thickness of each layer of the formula (2) is adjusted so as not to shift the center of spectral transmission/reflection regions. Adjustment coefficients are as follows:

| | |
|---|---|
| For the high refraction $n_{H2}$, $n_{H4}$: | 1.0 |
| For the middle refraction $n_{H1}$: | 1.05 |
| For the low refraction $n_{L1}$, $n_{L2}$, $n_{L3}$, $n_{L4}$: | 1.1 |

These exemplary embodiments of the invention provide half-mirrors which are effective in those optical systems which are required to cover wide wavelength regions including visible and near infrared spectra. More specifically, the first, second, fifth and sixth embodiments provide good half-mirror characteristics over wide length region of 400 nm to 700 nm. The third, fourth, seventh and eighth embodiments provide good half-mirror characteristics over wide length region of 400 nm to 800 nm.

When Formula (1) is used with perpendicular incident light, embodiment 3 is preferred. When Formula (1) is used with 45° incident light, embodiment 4 is preferred. When Formula (2) is used with perpendicular incident light, embodiment 7 is preferred. When Formula (2) is used with 45° incident light, embodiment 8 is preferred.

In these embodiments, the film thicknesses of the $\lambda_0/2$ and $\lambda_0/4$ layers in the coating structure may be adjusted to make the half-mirror usable at incident angles other than 0° and 45°.

According to the present invention, it is possible to obtain a half-mirror which can divide the incident light into reflected and transmitted light components substantially at a light quantity ratio of 1:1 over a wide wavelength region including visible and infrared spectra, without suffering substantial loss of light quantity.

In addition, the half mirror of the present invention exhibits flat spectral characteristics over a wide bandwidth, so that coloring of transmitted light and reflected light is prevented even when the center wavelength deviates due to manufacturing error, thus enhancing the effectiveness of the half-mirror.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:
1. A wide-band half mirror, comprising:
a transparent substrate; and
dielectric layers successively laminated on the transparent substrate so as to divide incident light into a transmitted light component and a reflected light component, wherein:

$$n_{sub}/(an_{H1} \cdot an_{L1} \cdot an_{H2} \cdot an_{L2} \ldots$$
$$an_{H(N-1)} \cdot an_{L(N-1)}) \cdot (bn_{HN} \cdot bn_{LN})^2/\text{air}$$

wherein:
n represents an index of refraction;
$n_{sub}$ represents the index of refraction of the substrate;
$n_{H\_}$ represents the indices of refraction of dielectric substances in the laminated layers, these indices of refraction being greater than $n_{sub}$;
$n_{L\_}$ represents the indices of refraction of dielectric substances in the laminated layers, these indices of refraction being smaller than $n_{sub}$;

$$n_{sub} \leq n_{H1} \leq n_{H2} \leq \ldots \leq n_{HN};$$

$$n_{sub} \geq n_{L1} \geq n_{L2} \geq \ldots \geq n_{LN};$$

$\lambda_o$ represents the center wavelength; and
coefficients a and b have values that define dielectric layer thicknesses so that optical paths travelled by light reflected by a front surface, and light reflected by a rear surface, are $\lambda_o/4$ and $\lambda_o/2$, respectively.

2. The wide-band half-mirror of claim 1, wherein: $a=2$ and $b=1$ when a desired angle of incidence of light is a perpendicular angle.

3. A wide-band half mirror, comprising:
a transparent substrate; and
dielectric layers successively laminated on the transparent substrate so as to divide incident light into a transmitted light component and a reflected light component, wherein:

$$n_{sub}/(an_{L1} \cdot an_{H1} \cdot an_{L2} \cdot an_{H2} \cdot \ldots an_{H(N-2)} \cdot an_{L(N-1)}) \cdot (bn_{HN} \cdot bn_{LN})^2/air$$

wherein:
n represents an index of refraction;
$n_{sub}$ represents the index of refraction of the substrate;
$n_{H\_}$ represents the indices of refraction of dielectric substances in the laminated layers, these indices of refraction being greater than $n_{sub}$;
$n_{L\_}$ represents the indices of refraction of dielectric substances in the laminated layers, these indices of refraction being smaller than $n_{sub}$;

$$n_{sub} \leq n_{H1} \leq n_{H2} \leq \ldots \leq n_{HN};$$

$$n_{sub} \geq n_{L1} \geq n_{L2} \geq \ldots \geq n_{LN};$$

$\lambda_o$ represents the center wavelength; and
coefficients a and b have values that define dielectric layer thicknesses so that optical paths travelled by light reflected by a front surface, and light reflected by a rear surface, are $\lambda_o/4$ and $\lambda_o/2$, respectively.

4. The wide-band half-mirror of claim 3, wherein: $a=2$ and $b=1$ when a desired angle of incidence of light is a perpendicular angle.

* * * * *